(12) United States Patent
Dole et al.

(10) Patent No.: US 7,429,153 B2
(45) Date of Patent: Sep. 30, 2008

(54) PIPE CHAMFERING TOOL

(75) Inventors: Douglas R. Dole, Whitehouse Station, NJ (US); Hubert Stria, Asbury, NJ (US); Leonard R. Swantek, Nazareth, PA (US)

(73) Assignee: Victaulic Company, Easton, PA (US)

( * ) Notice: Subject to any disclaimer, the term of this patent is extended or adjusted under 35 U.S.C. 154(b) by 352 days.

(21) Appl. No.: 11/339,349

(22) Filed: Jan. 25, 2006

(65) Prior Publication Data

US 2007/0172324 A1    Jul. 26, 2007

(51) Int. Cl.
B23B 51/00    (2006.01)
(52) U.S. Cl. ...................................... 408/211; 409/140
(58) Field of Classification Search ................. 408/199, 408/203.5, 211–213; 409/139, 140; 7/157
See application file for complete search history.

(56) References Cited

U.S. PATENT DOCUMENTS

| 1,662,936 A | 3/1928 | Philipp | |
|---|---|---|---|
| 2,470,392 A | 5/1949 | Gassmann | 77/73 |
| 3,137,208 A | 6/1964 | Andler | 90/12 |
| 3,232,145 A | 2/1966 | Wilson | 77/73 |
| 3,595,107 A | 7/1971 | Dackow | 82/4 C |
| 3,661,472 A | 5/1972 | Beauloye | 408/231 |
| 3,807,258 A | 4/1974 | Bjalme | 82/4 C |
| 3,946,456 A * | 3/1976 | Martin et al. | 15/105 |
| 4,220,060 A | 9/1980 | Bjödstrup | 82/4 C |
| 4,229,129 A | 10/1980 | Schaenzer | 408/228 |
| 4,586,408 A | 5/1986 | Goldner | 82/4 C |
| 4,595,321 A * | 6/1986 | Van Dalen | 408/205 |
| 4,678,380 A | 7/1987 | Zahuranec et al. | 408/211 |
| 5,020,221 A | 6/1991 | Nelson | 30/169 |
| 5,020,401 A | 6/1991 | Jiles | 82/113 |
| 5,076,122 A | 12/1991 | Katzenburger et al. | 82/113 |
| 5,180,260 A | 1/1993 | Phillips, Sr. | 408/211 |
| 5,716,171 A | 2/1998 | Malott et al. | 408/187 |
| 5,853,272 A | 12/1998 | Wartluft et al. | 408/199 |
| 6,099,211 A * | 8/2000 | Lee et al. | 408/1 R |
| 6,709,206 B1 | 3/2004 | Andes et al. | 408/211 |
| 6,993,848 B2 | 2/2006 | Snyder, Sr. et al. | 33/21.3 |
| 2001/0001935 A1 | 5/2001 | Wilk, Jr. et al. | 82/113 |
| 2002/0094247 A1 | 7/2002 | Wartluft et al. | 408/82 |
| 2003/0113176 A1 | 6/2003 | Kress | 408/146 |

(Continued)

FOREIGN PATENT DOCUMENTS

DE    19644630 A1 *  1/1998

(Continued)

*Primary Examiner*—David P. Bryant
*Assistant Examiner*—Eric A Gates
(74) *Attorney, Agent, or Firm*—Synnestvedt & Lechner LLP

(57) ABSTRACT

A cutting element and chamfering tool for pipe preparation is disclosed. The cutting element is formed from a ring having a split defining ends of the ring. One of the ends has a cutting edge. The one end is offset from the other to present the cutting edge to the pipe end. The ring has an inwardly facing angularly oriented surface that receives and centers the pipe end. The chamfer is cut when the ring and pipe end are rotated relatively to one another. The tool has a housing that holds the cutting element. The ends of the ring are offset when the ring engages a helical seat within the housing and/or when a radial set screw engaging the one end is tightened.

26 Claims, 8 Drawing Sheets

U.S. PATENT DOCUMENTS

2004/0226423 A1    11/2004    Oswald  .................. 83/165

FOREIGN PATENT DOCUMENTS

| | | |
|---|---|---|
| GB | 2384453 | 7/2003 |
| GB | 2390051 | 12/2003 |
| JP | 2000071102 A * | 3/2000 |
| WO | 2004/016393 | 2/2004 |

* cited by examiner

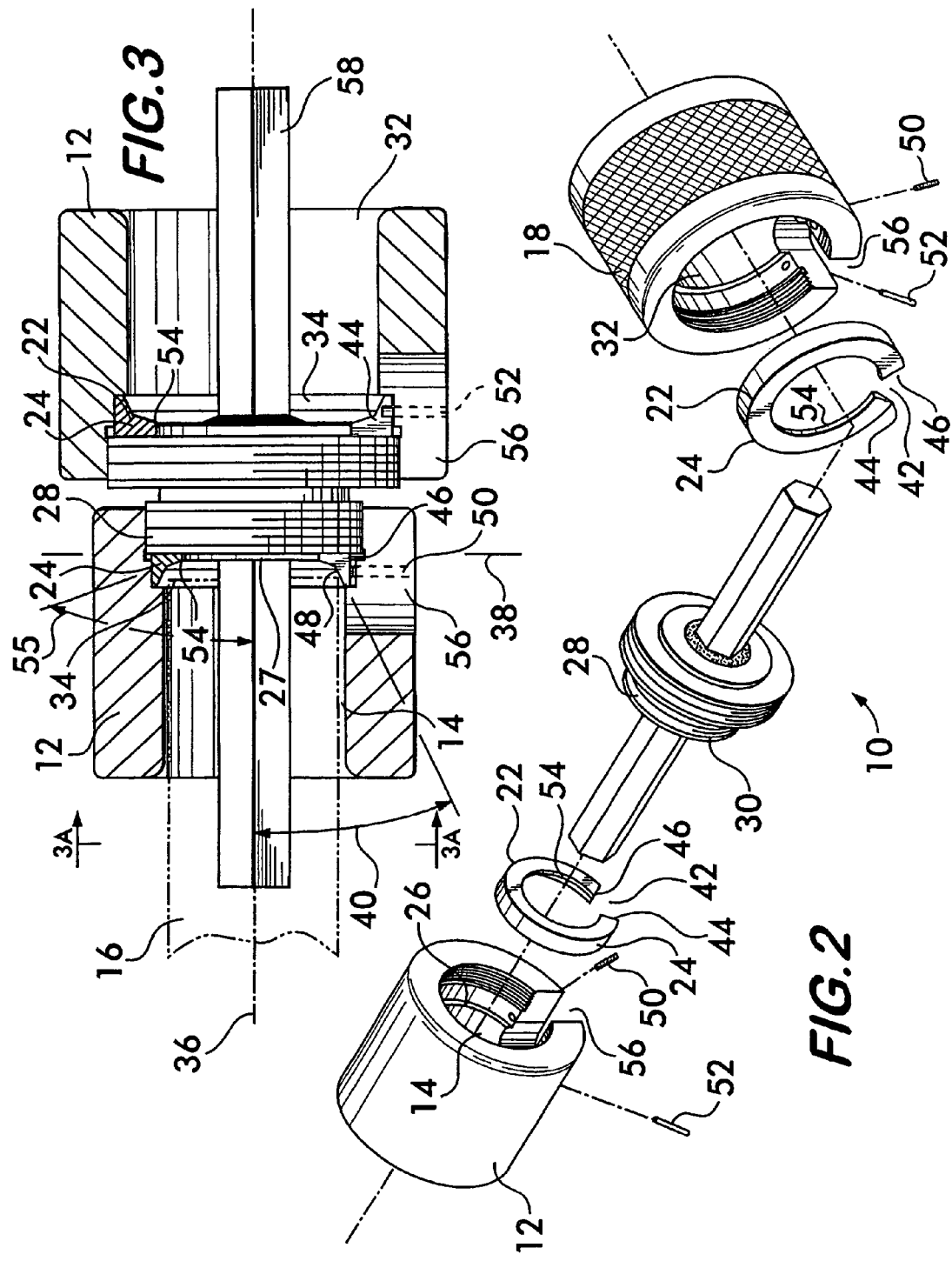

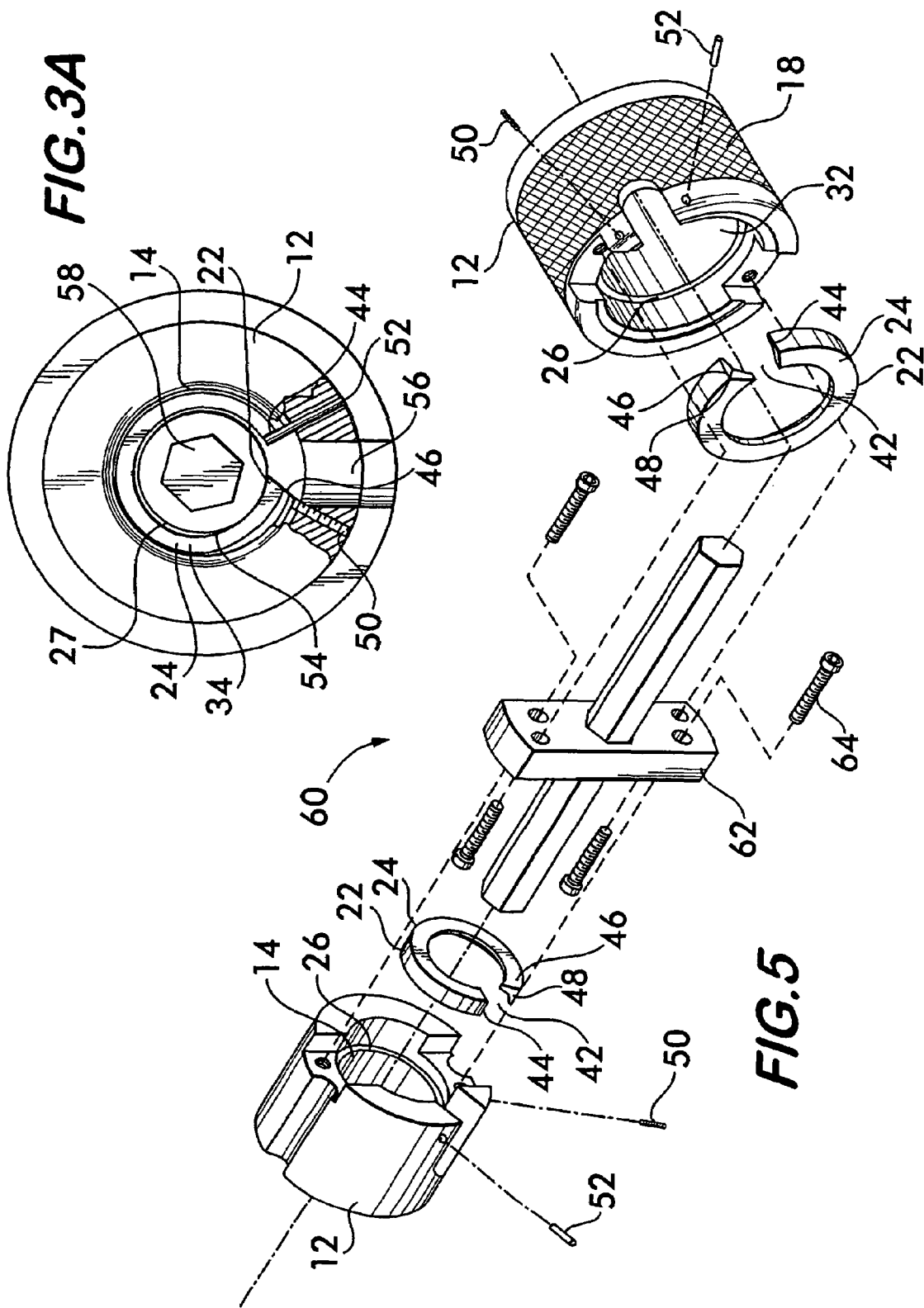

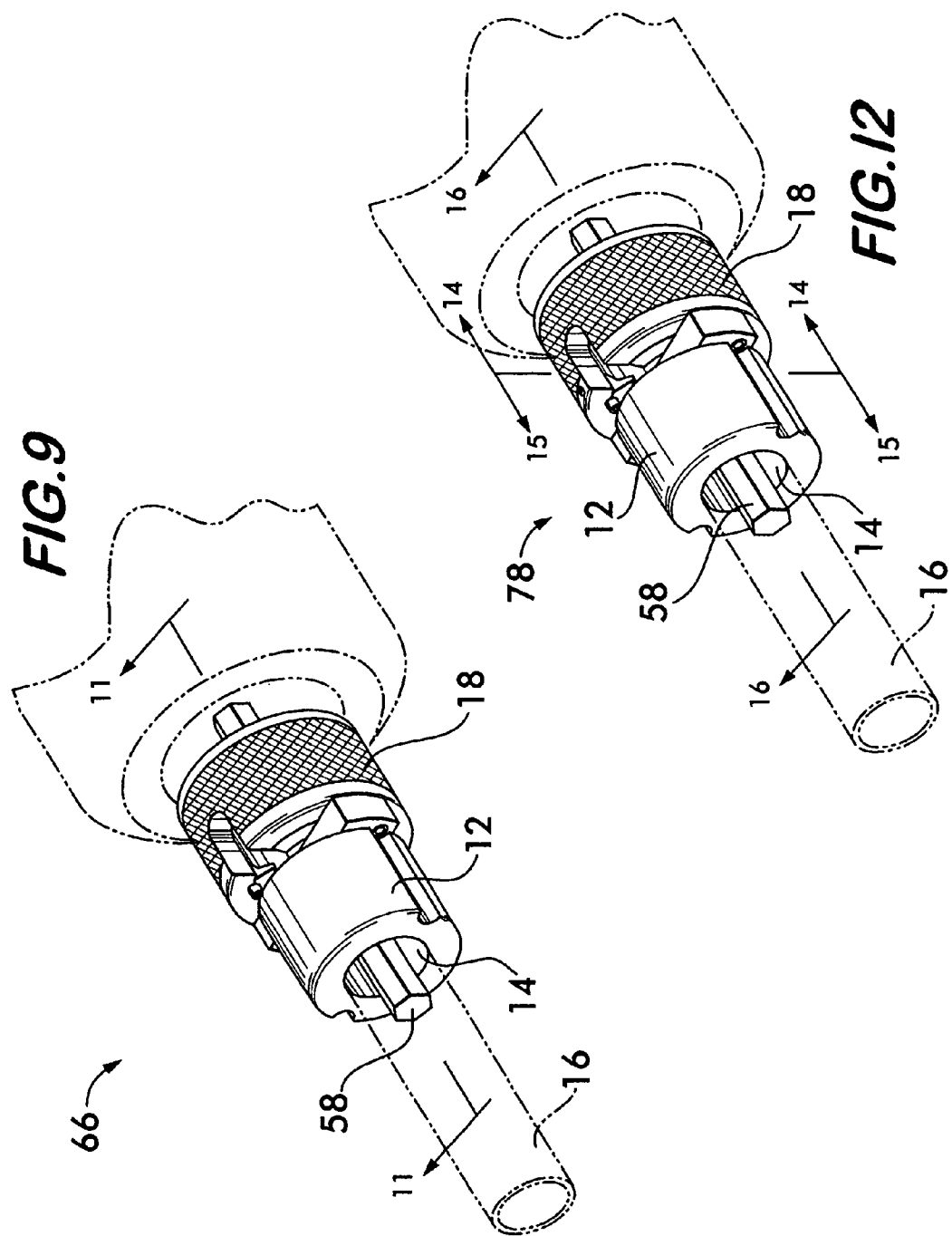

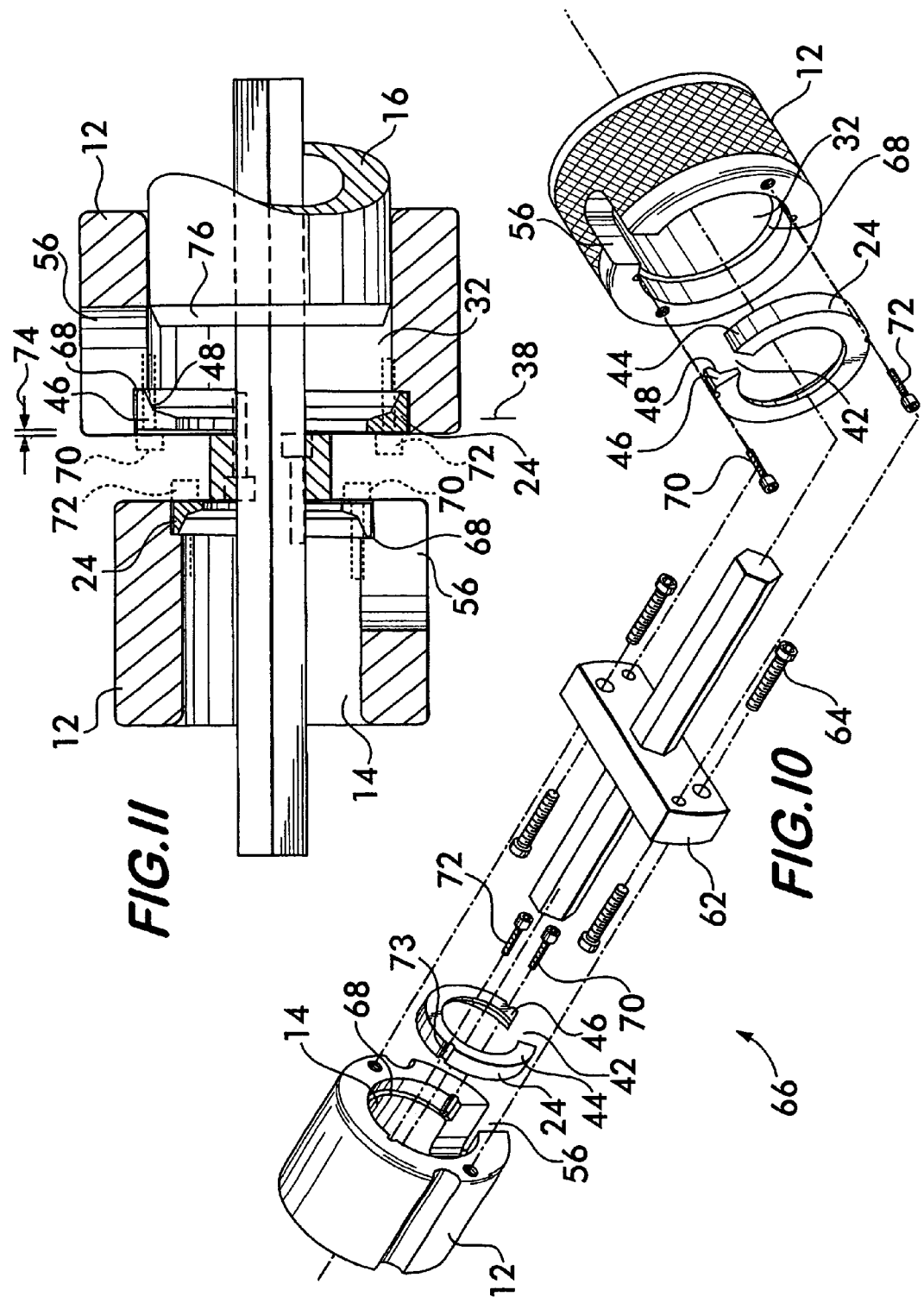

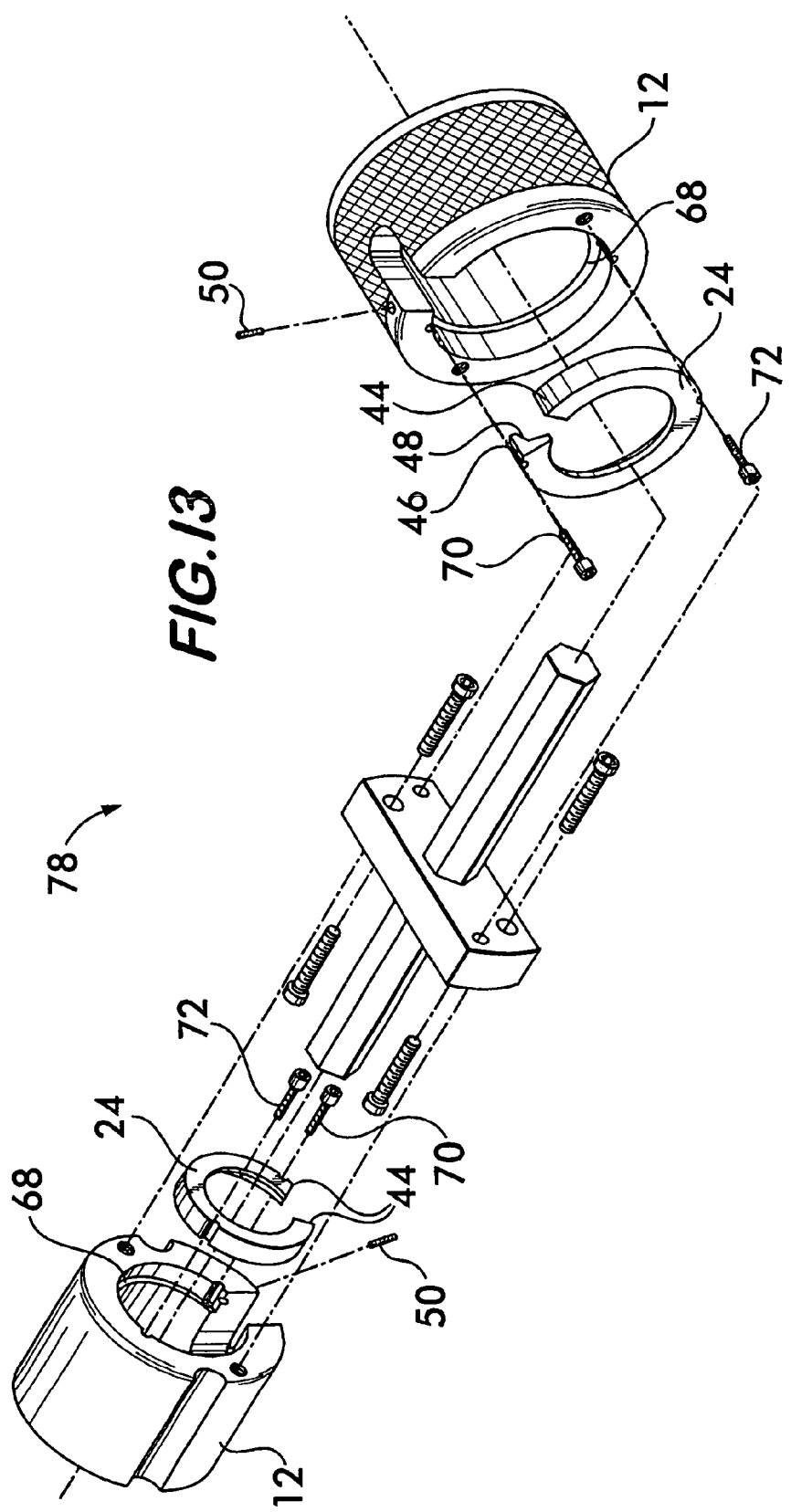

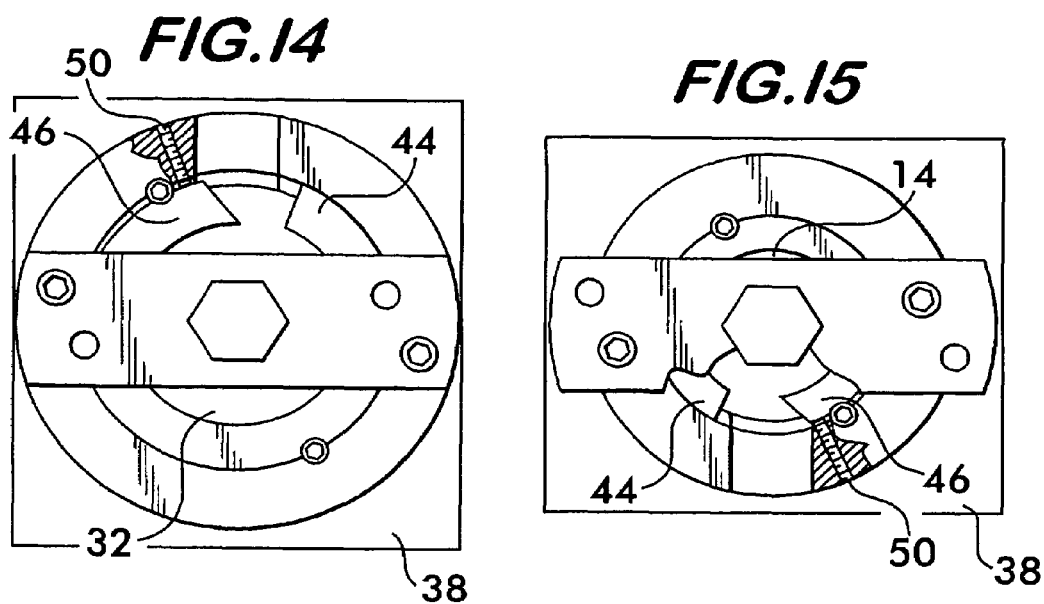
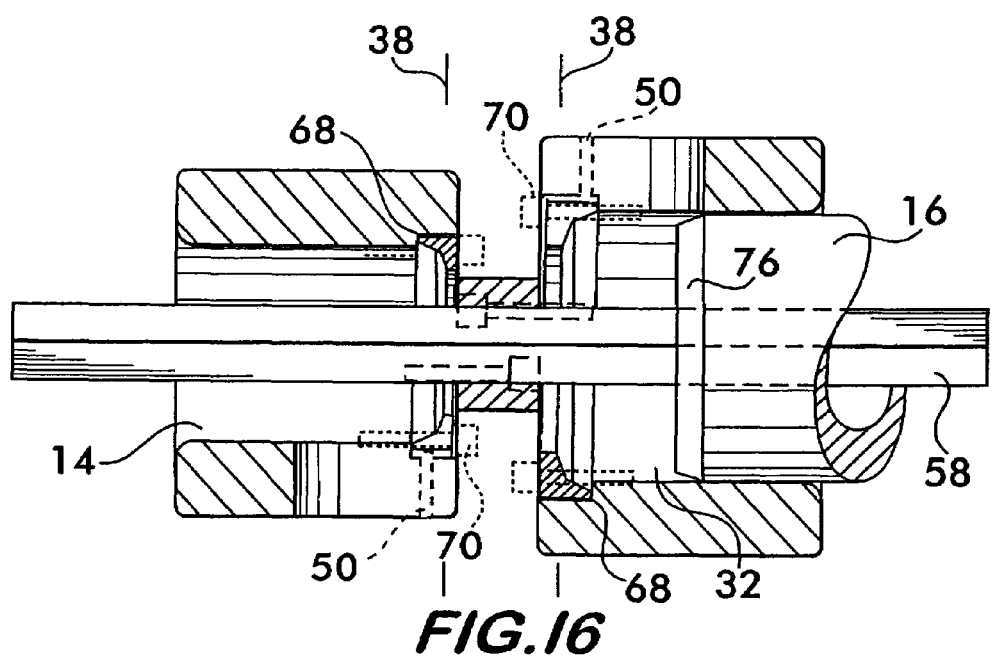

PIPE CHAMFERING TOOL

FIELD OF THE INVENTION

This invention concerns tools for preparing pipes for joining to one another, and especially for pipes joined using mechanical pipe couplings.

BACKGROUND OF THE INVENTION

Pipes, especially relatively small diameter copper pipes between one half inch and two inches nominal diameter, are used extensively to provide water service for homes, business and industry. Such pipes may be healingly joined to one another end to end using mechanical couplings to create a piping network for conveying water throughout a building such as a home, office or factory.

Mechanical couplings provide various advantages over traditional solder joints for connecting pipes in that they avoid the use of acid flux, solder and open flame to effect a connection. Assembly of a joint using a mechanical coupling also requires less time than a solder joint and may be performed by a less skilled worker. Assembly of a joint merely requires that a pipe end be inserted into a coupling so that the coupling and pipe end engage properly.

The mechanical coupling, which may be a fitting such as an elbow, tee or straight fitting, for example, includes a housing having a socket coaxially aligned with a receptacle for receiving the pipe end. A sealing member, such as an O-ring or a pressure responsive seal and a retainer are captured within the receptacle adjacent to the socket. The retainer may have a plurality of flexible teeth that extend around the circumference of the receptacle. The teeth project radically inwardly and are angularly oriented toward the socket. When the pipe end is inserted through the receptacle and into the socket, the teeth engage the pipe's outer surface and retain it within the coupling. Due to their angular orientation, the teeth are "self jamming" and resist motion of the pipe that would tend to force it from the receptacle. The sealing member within the receptacle engages the pipe and the housing to provide a fluid-tight seal, and the socket supports the pipe and provides bending stiffness to the joint, preventing angular deflection between the pipe and the coupling.

To obtain the advantages associated with a mechanical coupling and ensure an effective, fluid-tight joint, the pipe end must seat properly within the coupling. It must be insertable smoothly without causing damage to the sealing member or the retainer and must engage the socket over the proper engagement length so that the joint is secure and fluid tight. To this end it is found advantageous to chamfer the pipe end. Chamfering removes any burrs which could cut the sealing member or interfere with insertion of the pipe into the close-fitting socket. Chamfering also creates a smooth, tapered surface that facilitates insertion of the pipe end into the coupling, helping the pipe to align itself co-axially, more easily deflect retainer teeth, more easily radically compress the seal, and more easily enter the socket.

While there are many tools that chamfer pipe, they suffer from various disadvantages. They tend to be complicated and expensive, and they do not reliably cut uniform chamfers because it is difficult for the technician to maintain proper concentricity between the pipe and the tool and keep the pipe co-axial with the tool. With such tools there is furthermore no way to identify when the formation of the chamfer is complete without removing the tool from the pipe. There is clearly a need for an improved chamfering tool for pipe preparation, especially for use with mechanical fittings.

SUMMARY OF THE INVENTION

The invention concerns a cutting element for cutting a chamfer on a pipe end. The cutting element comprises a ring having an inwardly facing circumferential surface. The circumferential surface is angularly oriented with respect to an axis perpendicular to the plane of the ring. A split in the ring forms a pair of ends. One of the ends is offset relatively to the other end. A cutting edge is positioned on the one end of the ring. The cutting edge engages the pipe end when the pipe end is positioned in contact with the circumferential surface. The cutting edge cuts the chamfer when the ring and the pipe end are rotated about the axis relatively to one another.

In one embodiment, the one end of the ring is offset relatively to the other end in a direction substantially perpendicular to the plane of the ring. In another embodiment, the one end of the ring is offset relatively to the other end in a direction radically inwardly in the plane of the ring. In yet another embodiment, the one end of the ring is offset relatively to the other end both radically inwardly in the plane of the ring and in a direction substantially perpendicular to the plane of the ring.

The invention also concerns a tool for cutting a chamfer on a pipe end. The tool comprises a housing having a bore therein for receiving the pipe end. A ring as described above is positioned within the housing substantially concentric with the bore. The aforementioned cutting edge engages the pipe end when the pipe end is received within the bore. The tool and the pipe end are rotatable about the axis relatively to one another to cut the chamfer.

BRIEF DESCRIPTION OF THE DRAWINGS

FIG. 2 is an exploded view of the tool shown in FIG. 1;

FIG. 3 is a longitudinal sectional view taken at line 3-3 of FIG. 1;

FIG. 3A is a cross sectional view taken at line 3A-3A of FIG. 3;

FIG. 5 is an exploded view of the tool shown in FIG. 4;

FIG. 9 is a perspective view of another pipe chamfering tool according to the invention;

FIG. 10 is an exploded view of the pipe chamfering tool shown in FIG. 9;

FIG. 11 is a longitudinal sectional view taken at line 11-11 in FIG. 9;

FIG. 12 is a perspective view of another pipe chamfering tool according to the invention;

FIG. 13 is an exploded view of the tool shown in FIG. 12;

FIG. 14 is a cross sectional view of the tool taken at line 14-14 in FIG. 12;

FIG. 15 is a cross sectional view of the tool taken at line 15-15 in FIG. 12; and FIG. 16 is a longitudinal sectional view taken at line 16-16 in FIG. 12.

DETAILED DESCRIPTION OF THE EMBODIMENTS

Figure 1:
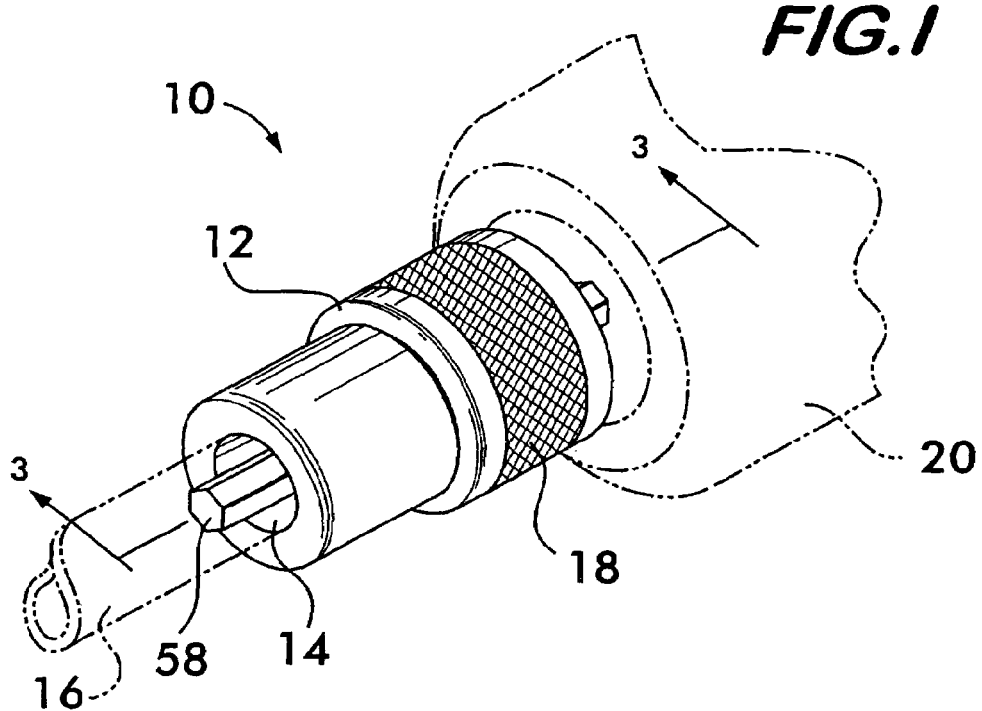
FIG. 1 is a perspective view of a pipe chamfering tool according to the invention.

FIG. 1 shows a chamfering tool 10 according to the invention. Tool 10 has a housing 12 with a bore 14 to receive a pipe 16, shown in phantom line. Rotation of tool 10 relatively to pipe 16 cuts a chamfer on the end of the pipe to prepare it for engagement with a coupling. The tool may be manually rotated as evidenced by the knurled grip 18 on the housing, or the tool may be mounted in a rotating chuck 20 of a drill or lathe as described in detail below.

As shown in FIG. 2, a cutting element 22 is positioned within bore 14. The cutting element comprises a ring 24 positioned substantially coaxially within the bore. The diameter of the ring is sized so as to fit within the bore and receive pipe for chamfering. The ring is captured within the housing 12 between a shoulder 26 and a disk 28 which engages the housing via screw threads 30. Threaded disk 28 is advantageous because it permits easy disassembly of tool 10 for replacement of the cutting element. Note that the tool 12 may have additional bores 32, each with a respective cutting element 22. To accommodate different size pipe the bores may have different diameters as shown herein where bore 32 is larger in diameter than bore 14. The cutting elements are sized appropriately to fit within their respective bores and chamfer the size pipe appropriate for the bore.

As shown with reference to FIG. 3, ring 24 has an inwardly facing circumferential surface 34. Surface 34 is angularly oriented with respect to an axis 36 substantially perpendicular to the plane 38 of ring 24. Surface 34 receives and guides the pipe 16 when it engages the cutting element 22. Due to its angular orientation the surface tends to continually center the pipe within the bore as the tool and pipe are rotated relatively to one another. This helps prevent chatter, an unwanted oscillation of the pipe and the tool which causes the chamfer to have a rough, saw-tooth finish. Chatter may occur due to clearance between the bore 14 and the pipe 16 that is necessary to accommodate the raised lip on the pipe which results from roller cutting of metal pipe. Chatter also causes unwanted vibration, making chamfering noisy and uncomfortable 15 for the technician. The angularly oriented surface 34 prevents chatter because it maintains continuous contact with the pipe as the chamfer is cut, thereby not permitting any clearance conditions to be created which otherwise would allow chatter to initiate and propagate. Orientation angles 40 for surface 34 may range between about 15 degrees to about 45 degrees, with 25 degrees being a practical angle which effects centering of the pipe without excessive friction inhibiting relative rotation. Note that the surface 34 may be flat as shown, or curved. For a curved surface the orientation angle will vary as a function of position along the curve, every point along the curve having its orientation angle measured by a tangent line to the curve.

As shown in FIG. 2, ring 24 has a split 42 which defines a pair of ends 44 and 46. Split 42 may take the form of a gap, with the ends 44 and 46 of the ring 24 in spaced relation for reasons as described below. As shown in FIG. 3, a cutting edge 48 is positioned on one of the ends 46. End 46 is offset from end 44 in a direction radically inwardly in the plane 38 of ring 24. The offset is effected by a set screw 50 that extends through housing 12 and engages end 46. Tightening of the set screw deflects the end 46 inwardly and offsets it from end 44. The offset distance between ends 46 and 44 in the radial direction may range between about 0.001 inches and about 0.015 inches for practical cutting elements used with copper pipe, larger offsets being practical for plastic pipe. The offset presents the cutting edge 48 to the pipe 16 when the pipe engages surface 34. Relative rotation of the pipe and tool cause the cutting edge to form a chamfer on the pipe. The angle of the cutting edge, which substantially corresponds to the orientation angle 40 of the surface 34, determines the angle of the chamfer cut on the pipe. During relative rotation of the tool and the pipe, rotation of the ring 24 within housing 12 is prevented by a pin 52 that extends through the housing and engages the opposite end 44 of the ring. This feature is illustrated in FIG. 3 with respect to a second ring 24 in additional bore 32, and is similar for ring 24 in bore 14.

Also illustrated in FIG. 2 is a radial stop surface 27 positioned on the disk 28. Stop surface 27 extends circumferentially around the disk. A stop surface may be advantageously positioned on each side of the disk to engage each ring 24. The stop surface aids in the proper setting of the offset of the ring end 46. As shown in FIG. 3A, the stop surface 27 engages the end 46 of ring 24 and has a diameter sized so that, when the end 46 is engaged and can be deflected no further by the action of set screw 50, the radial offset of the end 46 is at the desired magnitude. Stop surface 27 makes changing the cutting element 22 easy in that no measurements are required to adjust the proper offset of the end 46, one merely needs to tighten the set screw 50 until the end 46 engages the stop surface 27 and the set screw will advance no further.

Ring 24 may also have a stop flange 54 that projects inwardly from the circumferential surface 34. Stop flange 54 engages the pipe upon completion of the chamfer formation and prevents further cutting of the pipe end. Stop flange 54 is shown with an orientation angle 55 that allows roller cut pipe to be chamfered a further distance back than otherwise possible with a perpendicular stop. Practical angles 55 range between about 60° to about 80° relative to axis 36. An opening 56 is positioned within the housing 12 adjacent to the split 42 defining the ends 44 and 46 of the ring 24. The opening 56 allows sward cut from the pipe during chamfering to be discharged from the housing. For easy discharge of the sward it is advantageous that the split 42 take the form of the gap as illustrated.

As best shown in FIG. 3, bores 14 and 32 are coaxially aligned enabling a shaft 58 to be attached to disk 28 within the bore. Shaft 58 is co-axial with the bores enabling it to be engage able with the chuck 20 (FIG. 1) allowing the tool 10 to be used with a drill, lathe or other power device.

Figure 4:
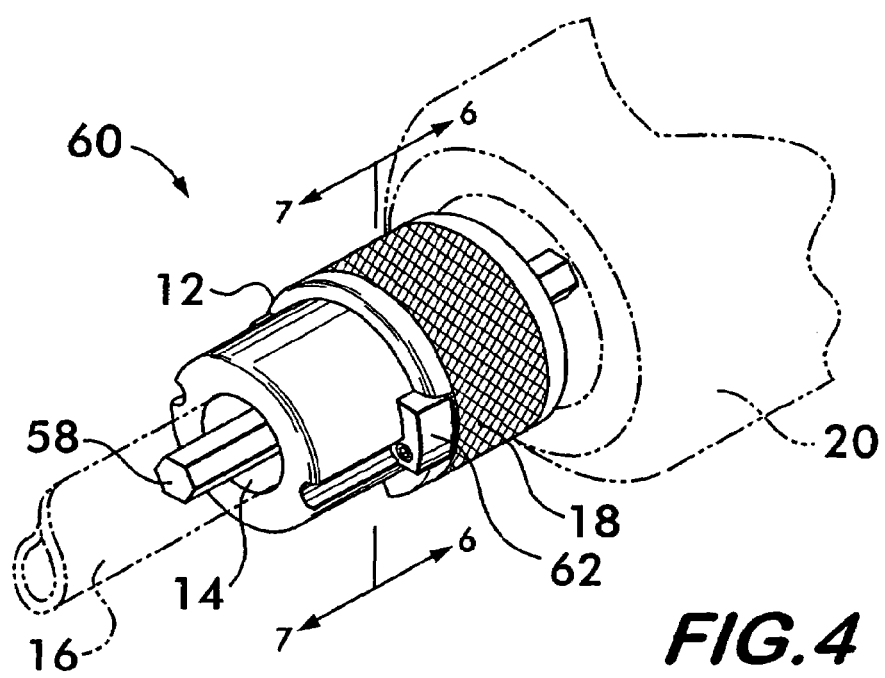
FIG. 4 is a perspective view of another pipe chamfering tool according to the invention.
Figure 8:
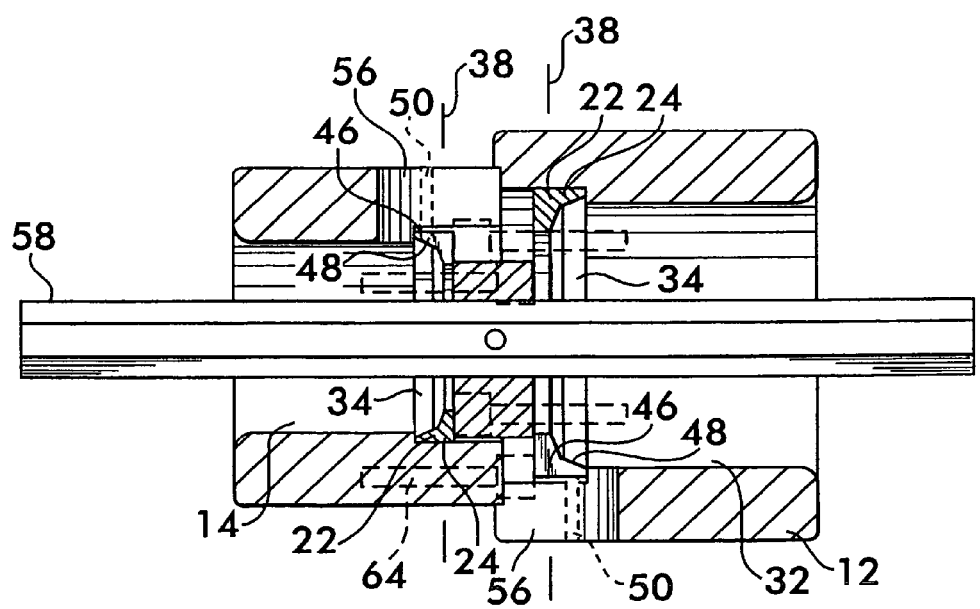
FIG. 8 is a longitudinal sectional view taken at line 8-8 of FIG. 6.

FIGS. 4 and 5 show another embodiment 60 of a chamfering tool according to the invention. Tool 60 has a housing 12 with bores 14 and 32 to receive pipe 16. Cutting elements 22 comprising rings 24 are located within respective bores and are captured between shoulders 26 within the housing and a bar 62 that is attached to the housing via bolts 64. As best shown in FIG. 8, bores 14 and 32 are coaxially aligned allowing a shaft 58 to be attached to bar 62 and permit power turning of the tool 60 using a drill, for example.

Figure 6:
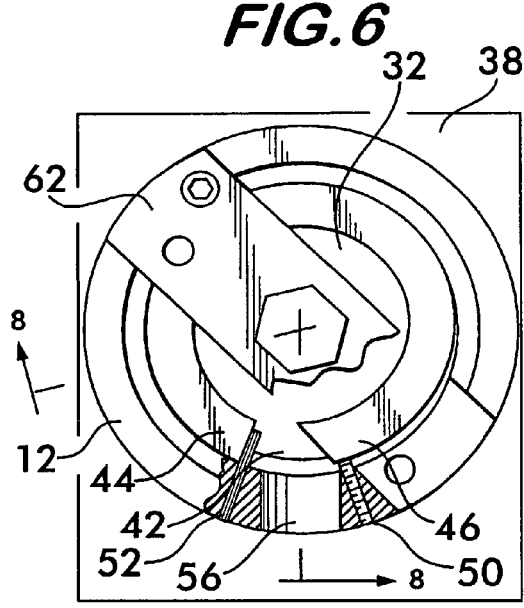
FIG. 6 is a cross sectional view of the tool taken at line 6-6 in FIG. 4.
Figure 7:
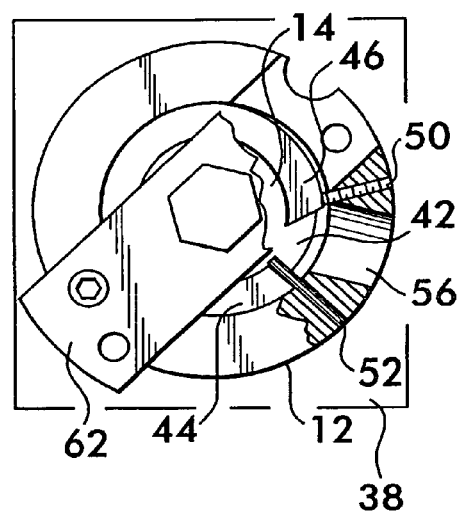
FIG. 7 is a cross sectional view of the tool taken at line 7-7 in FIG. 4.

Cutting elements 22 are substantially as described above, and as shown in FIGS. 6 and 7, the rings 24 comprising the cutting elements are held against rotation within the housing by pins 52 that extend through the housing and engage ring ends 44. The other ends 46 of the rings having the cutting edges 48 thereon are offset radically inwardly in the plane 38 of the rings by set screws 50 extending through the housing. As mentioned above openings 56 are positioned within the housing adjacent to the split 42 between the ring ends to permit sward to be discharged.

FIG. 9 illustrates another tool embodiment 66 for chamfering pipe 16 according to the invention. As shown in FIGS. 10 and 11, ring 24 is received within the bore 32 of housing 12 on a helical seat 68. Two bolts 70 and 72 engage the housing and are used to deflect the ring 24 and conform it to the helical shape of the seat. Bolt 70 is positioned proximate to the end 46 of the ring where the cutting edge is located, and bolt 72 is substantially diametrically opposite to bolt 70. Tightening these bolts 70 and 72 effects a displacement of end 46 relatively to end 44 and achieves an offset 74 (see FIG. 11) of end 46 relatively to end 44 in a direction substantially perpendicular to the plane 38 of the ring. This offset allows the cutting edge 48 to be presented to the pipe 16 and cut a chamfer 76. Offsets 74 out of the plane 38 may range in value between about 0.005 inches and about 0.020 inches for metal pipe, and larger for plastic pipe. Note that the bolts 70 and 72 also engage notches 73 in the circumference of ring 24 to prevent its relative rotation within housing 12.

FIGS. 12 and 13 illustrate another embodiment 78 of a chamfering tool according to the invention. In tool 78, ring 24 is again received on a helical seat 68 within the housing, and bolts 70 and 72 engage the ring and the housing. Additionally, a set screw 50, positioned proximate to end 46 of ring 24 (where cutting edge 48 is positioned) extends substantially radically and engages the ring and the housing. On this tool embodiment, presentation of the cutting edge 48 to the pipe is effected by offsetting the ring end 46 relatively to end 44 both radically within the plane 38 of the ring (as shown in FIGS. 14 and 15) as well as in a direction substantially perpendicular to the plane of the ring as shown in FIG. 16. Tightening of bolts 70 and 72 adjusts the amount of out of plane offset of ends 44 and 46, whereas tightening of set screw 50 provides adjustment for the degree of radial offset in the plane of the ring.

Housing 12 may be made of lightweight metal such as aluminum. Rings 28 are preferably high speed cutting steel heat treated to a Rockwell "C" scale hardness of about 60. A titanium nitrate coating on the ring is advantageous to maintain a sharp cutting edge and provide lubricity between the tool and the pipe. Other steels having high yield strength allowing significant deflection without taking a permanent set are also feasible. Alternately, the cutting elements may be permanently formed into the desired offset shapes described above, with the various fasteners being used merely to capture the ring and prevent its relative rotation.

Pipe chamfering tools according to the invention provide an effective and easy to use tool for preparing pipes for use with pipe couplings, either in a manual or powered mode of operation.

What is claimed is:

1. A cutting element for cutting a chamfer on a pipe end, said cutting element comprising:
   a ring having an inwardly facing circumferential surface, said circumferential surface being angularly oriented with respect to an axis perpendicular to a plane of said ring;
   a split in said ring forming a pair of ends, one of said ends being offset relatively to the other said end;
   a cutting edge positioned on said one end, said cutting edge engaging said pipe end when said pipe end is positioned in contact with said circumferential surface, said cutting edge cutting said chamfer when said ring and said pipe end are rotated about said axis relatively to one another;
   a stop flange projecting inwardly from said circumferential surface, said stop flange being angularly oriented with respect to said axis, said stop flange engaging said pipe end upon completion of said cutting of said chamfer.

2. A cutting element according to claim 1, wherein said one end is offset relatively to said other end in a direction substantially perpendicular to the plane of said ring.

3. A cutting element according to claim 2, wherein said one end is offset from said other end by distance between about 0.005 inches and about 0.020 inches.

4. A cutting element according to claim 1, wherein said one end is offset relatively to said other end in a direction radially inwardly in the plane of said ring.

5. A cutting element according to claim 4, wherein said one end is offset from said other end by a distance between about 0.001 inches and about 0.015 inches.

6. A cutting element according to claim 1, wherein said one end is offset relatively to said other end radially inwardly in the plane of said ring and in a direction substantially perpendicular to the plane of said ring.

7. A cutting element according to claim 1, wherein said stop flange has an orientation angle between about 60° and about 80°.

8. A cutting element according to claim 1, wherein said circumferential surface has an orientation angle between about 15° and about 45°.

9. A cutting element according to claim 1, wherein said circumferential surface has an orientation angle of about 25°.

10. A tool for cutting a chamfer on a pipe end, said tool comprising:
    a housing having a bore therein for receiving said pipe end;
    a ring positioned within said housing substantially concentric with said bore, said ring having an inwardly facing circumferential surface, said circumferential surface being angularly oriented with respect to an axis perpendicular to a plane of said ring;
    a split in said ring forming a pair of ends, one of said ends being offset relatively to the other said end;
    a cutting edge positioned on said one end, said cutting edge engaging said pipe end when said pipe end is received within said bore, said tool and said pipe end being rotatable about said axis relatively to one another to cut said chamfer;
    a stop flange projecting inwardly from said circumferential surface, said stop flange being angularly oriented with respect to said axis, said stop flange engaging said pipe end upon completion of said cutting of said chamfer.

11. A tool according to claim 10, wherein said one end is offset relatively to said other end in a direction substantially perpendicular to the plane of said ring.

12. A tool according to claim 11, wherein said one end is offset from said other end by distance between about 0.005inches and about 0.020inches.

13. A tool according to claim 11, wherein said housing has a helical seat positioned within said bore, said seat receiving said ring and thereby establishing said offset of said ends in said direction substantially perpendicular to the plane of said ring.

14. A tool according to claim 10, wherein said one end is offset relatively to said other end in a direction radially inwardly in the plane of said ring.

15. A tool according to claim 14, wherein said one end is offset from said other end by distance between about 0.001inches and about 0.015inches.

16. A tool according to claim 14, further comprising a stop surface mounted within said housing, said stop surface being positioned so as to engage said one end of said ring and limit said offset in said direction radially inwardly in the plane of said ring.

17. A tool according to claim 10, wherein said one end is offset relatively to said other end radially inwardly in the plane of said ring and in a direction substantially perpendicular to the plane of said ring.

18. A tool according to claim 10, wherein said stop flange has an orientation angle between about 60° and about 80°.

19. A tool according to claim 10 further comprising:

a second bore in said housing for receiving said pipe end;

a second ring positioned within said housing substantially concentric with said second bore, said second ring having an inwardly facing second circumferential surface, said second circumferential surface being angularly oriented with respect to a second axis perpendicular to a plane of said second ring;

a split in said second ring forming a pair of second ends in spaced apart relationship, one of said second ends being offset relatively to the other said second end;

a second cutting edge positioned on said one second end, said second cutting edge engaging said pipe end when said pipe end is received within said second bore, said tool and said pipe end being rotatable about said second axis a relatively to one another to cut said chamfer.

20. A tool according to claim 19, wherein said bores are coaxially aligned with one another.

21. A tool according to claim 19, wherein one of said bores has a diameter greater than the other said bore, and one of said rings positioned within said one bore has a diameter greater than the other said ring positioned in the other said bore.

22. A tool according to claim 10, further comprising a shaft mounted on said tool, said shaft being positioned coaxially with said bore.

23. A tool according to claim 22, wherein said shaft extends outwardly from said bore.

24. A tool according to claim 22, wherein said shaft is mounted on a bar attached to said housing.

25. A tool according to claim 22, wherein said shaft is mounted on a disk attached to said housing.

26. A tool for cutting a chamfer on a pipe end, said tool comprising:

a housing having a bore therein for receiving said pipe end;

a ring positioned within said housing substantially concentric with said bore, said ring having an inwardly facing circumferential surface, said circumferential surface being angularly oriented with respect to an axis perpendicular to a plane of said ring;

a split in said ring forming a pair of ends, one of said ends being offset relatively to the other said end in a direction substantially perpendicular to the plane of said ring, said housing having a helical seat positioned within said bore, said seat receiving said ring and thereby establishing said offset of said ends in said direction substantially perpendicular to the plane of said ring;

a cutting edge positioned on said one end, said cutting edge engaging said pipe end when said pipe end is received within said bore, said tool and said pipe end being rotatable about said axis relatively to one another to cut said chamfer.

* * * * *